United States Patent
Wyett et al.

(10) Patent No.: US 7,437,348 B1
(45) Date of Patent: Oct. 14, 2008

(54) METHOD AND SYSTEM FOR A NON-GEOREDUNDANT FAILOVER SYSTEM

(75) Inventors: Richard Michael Wyett, Spring Hill, KS (US); Dean Lee Saghier, Olathe, KS (US); Margaret Mary McMahon, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 694 days.

(21) Appl. No.: 11/045,656

(22) Filed: Jan. 28, 2005

(51) Int. Cl.
*G06F 17/30* (2006.01)

(52) U.S. Cl. .................... 707/2; 709/201; 709/202; 709/203; 715/200

(58) Field of Classification Search ............. 707/2; 709/201–203; 715/200
See application file for complete search history.

(56) References Cited

U.S. PATENT DOCUMENTS

2001/0047409 A1\* 11/2001 Datta et al. ............. 709/224
2006/0268930 A1\* 11/2006 Preston et al. ............. 370/466

\* cited by examiner

*Primary Examiner*—John Cottingham
*Assistant Examiner*—Noosha Arjomandi (57) ABSTRACT

The present invention implements computing systems in a configuration to reduce downtime. The computing systems are configured, without implementing a hot stand-by or mirrored configuration, to handle mission critical applications without failing. A user may determine the benefit of implementing the configuration over traditional methods, and may forecast estimated revenues generated from business operations in the configuration.

12 Claims, 7 Drawing Sheets

METHOD AND SYSTEM FOR A NON-GEOREDUNDANT FAILOVER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer hardware and software performing computer system deployment, network capacity planning, backup network operations planning, and network recovery.

BACKGROUND OF THE INVENTION

Network planning and planning for system recovery using computer systems have become an increasingly important item to corporations. Customers who use computing services have high expectations in wanting reduced costs for the services and little or no downtime when using those services. Furthermore, corporations and governments are entrusted to provide critical services in the event of certain disasters like terrorist activity, electrical outages, or natural disasters including hurricanes, tornadoes, and floods. As a result, a high expectation is placed on these corporations and governments to have an effective strategy in place to prevent or reduce computer system failures, called a failover (backup) system.

Failover systems sometimes include a clone of the original computer systems to provide a concurrent level of service as the original computer systems. Since cost may be a significant factor in the implementation of failover systems, one must understand the revenue impact that may be incurred from implementing both the original computer system and failover system. A very elaborate failover system might work well but may also be cost prohibitive.

In the current state of the arts, many computer systems implement a georedundant configuration for a failover system. The term georedundant means duplicating and locating for purposes here. When used in this document, georedundant configuration means a computer system that has been duplicated and located, and also connected to the original computer system. For example, if two computer systems are deployed in a network, the georedundant configuration would require two additional computer systems (identical to the original two computer systems) to be deployed in the network. Both the original computer systems and the duplicate computer systems would operate in the network and be connected together.

Georedundant configurations may be implemented in two ways for individual computer systems: "hot stand-by" or "mirrored" mode for computer systems. In the "hot stand-by" mode, the original computer system and the duplicate computer system operate together in an active/stand-by state. Computer traffic runs on only one computer system at a time under normal conditions in this state. Furthermore, the computer systems can switch their active/stand-by state with each other at time intervals. In the "mirrored" mode, the original computer system and the duplicate computer system share the workload equally. In this mode, both computer systems process half the amount of traffic as would normally pass through them.

Whereas one computer system handles the full workload between the two connected system and the other computer system waits in stand-by in the "hot stand-by" mode, in the "mirrored" mode, both computer systems handle half the workload while being connected together.

Fortunately, when a failure occurs in one computer system in the georedundant configuration, the other computer system can take over the computer traffic regardless of the types of modes implemented. This presents some unique problems from a processing standpoint. In the georedundant configuration, the computer system may only use fifty percent of its processing capability theoretically. In actuality, this number is closer to 40%. The reason for these figures are due to the configuration of the computer systems. One computer system must be implemented so that it can handle not only its processing traffic but also the processing traffic from a failed computer system. In the "hot stand-by" mode, if one computer system fails, the other one takes over all the processing of both systems. In the "mirrored" mode, the same thing occurs. A failure in one computer system will result in the other computer system handling all of the traffic.

In our discussion here, the georedundant configuration uses two computer systems, which averages out to about 50% processing utilization for each computer system. That means for every critical computer system needed in a network, a second computer system would have to be purchased, but only 50% processing utilization could be allocated for use since the failover strategy for the georedundant configuration would have to implemented. If a computer system failed then theoretically the duplicate computer system could takeover operations of the failed computer system's 50% processing utilization resulting in a 100% fully-used processing utilization at the duplicate computer system. The 50% number is a theoretical estimate. The processing utilization is closer to 40% for each computer system since no computer system could process computer traffic over a sustainable period at 100% if a failure in one of the systems occurred. Some processing utilization must be reserved for the administration of the computer system itself. Therefore, in a georedundant configuration with two computer systems, each computer system averages a use of approximately 40% processing utilization, an expensive setup when the number of computer systems are increased for more business needs. This means that a computer system may have an allotted processing capability of 80% dedicated to computer traffic. The remaining 20% would be reserved for administration activities. So, in the "hot stand-by" mode, one computer system processes at 80% capacity while the other waits idly ready to takeover the 80% capacity in the event of a failure. In the "mirrored" mode, both computer systems operate at 40% capacity with 40% extra processing capacity waiting idly on both systems to takeover from a failure in the opposite computer system.

For some time, it has been assumed that computer systems could not exceed 50% processing capacity for computer processor unit (CPU), memory, and disk because (as shown above) the computer system would be unable to sustain the additional load. On may see the problem of implementing a georedundant configuration for a failover system. The computer systems that must be implemented are not permitted to operate beyond a certain capacity. Business leaders may not take kind to the idea that a duplicate computer system has to be purchased and that that the total system can only operate at a certain capacity level for each computer system.

BRIEF SUMMARY OF THE INVENTION

The present invention provides a method to extend the processing capability of computing devices beyond 50%. The present invention provides methods and system for determining the distribution of increased business transactions by implementing a failover system in a non-georedundant configuration. Additional information may be determined that would reduce hardware procurements, reduce outages, and extend the operating life of existing hardware.

In a first aspect, a computer-implemented method for reducing downtime in a non-georedundant configuration is shown. The method includes estimating a set of computing devices to execute business services in a network. The method also includes adding computing devices with at least eighty percent capacity each to the set of computing devices to prevent operating downtime in the network.

In a second aspect, a computer-implemented method for determining processing gains in a non-georedundant environment is shown. The method includes estimating a set of computing device to execute a set of business services in a network. The method also includes calculating a capacity for the computing devices in a georedundant configuration and calculating a capacity for the computing devices in a non-georedundant configuration. The method further includes determining processing gains between the two capacities In a final aspect, a system for preventing operating failure in a network is shown. The system includes at least one pair of computing devices operable in the network, each computing device of the at least one pair of computing devices operable in one of two clusters in the network, each computing device operable to execute mission critical applications, and each computing device operable with a forty percent capacity under normal conditions. The system further includes two additional computing devices connected to the at least one pair of computing devices operable to takeover operations of the a failure of a computing device in the at least one pair of computing devices, and the two additional computing devices operable with an eighty percent capacity under normal conditions. The system also includes one or more communications channels operable to link the at least one pair of computing devices and the additional computing devices in the network to facilitate the transfer of data.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION OF THE INVENTION

The present invention will be better understood from the detailed description provided below and from the accompanying drawings of various embodiments of the invention, which describe, for example, methods that allow users to rate web sites, and obtain previously entered rating information about a web site. The detailed description and drawings, however, should not be read to limit the invention to the specific embodiments. Rather, these specifics are provided for explanatory purposes that help the invention to be better understood.

Exemplary Operating Environment

Figure 1:
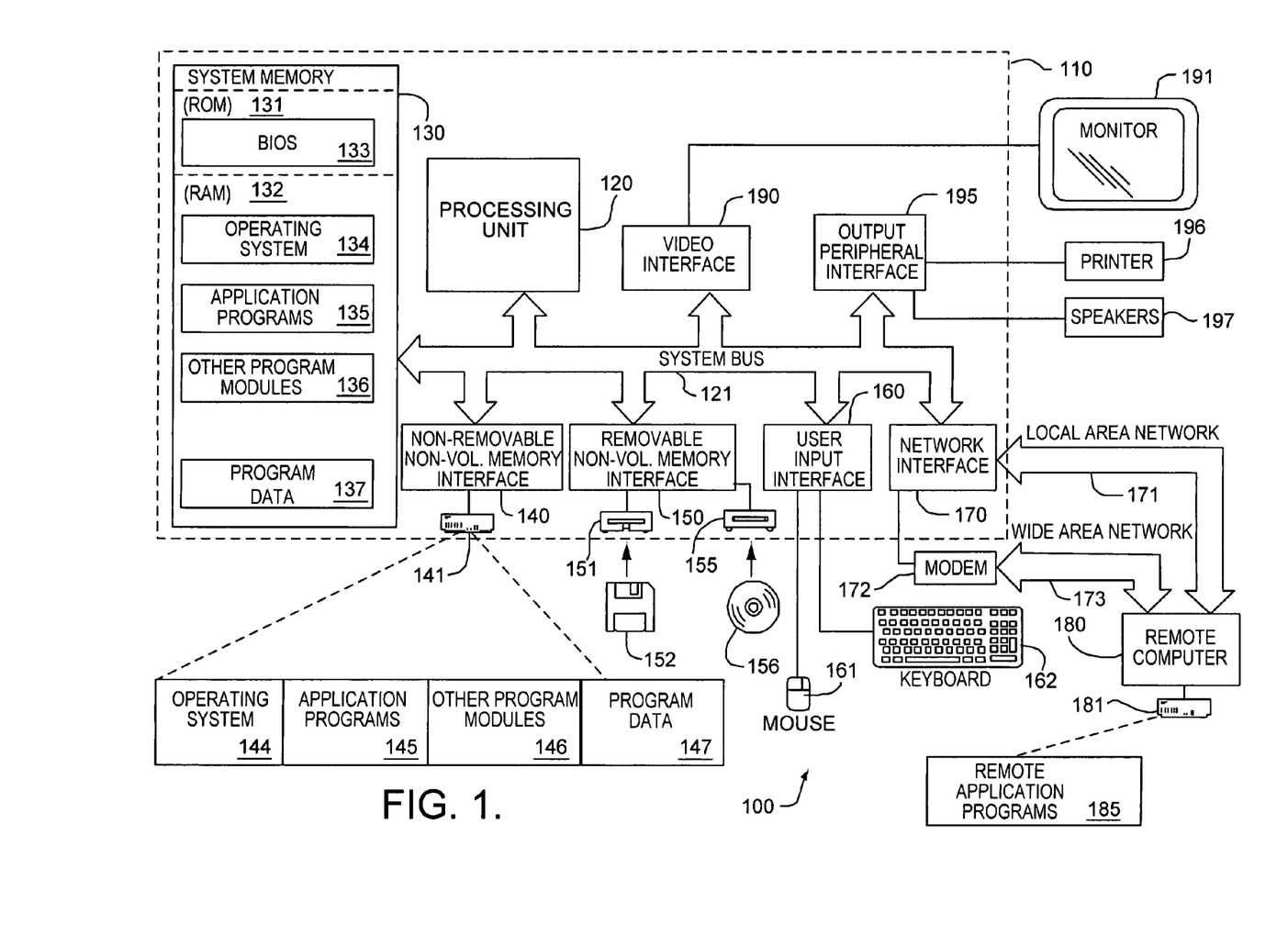
FIG. 1 is a block diagram of a computing system suitable for use with the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between the various steps herein disclosed unless and except when the order of individual steps is explicitly described.

Failover System

Figure 2:
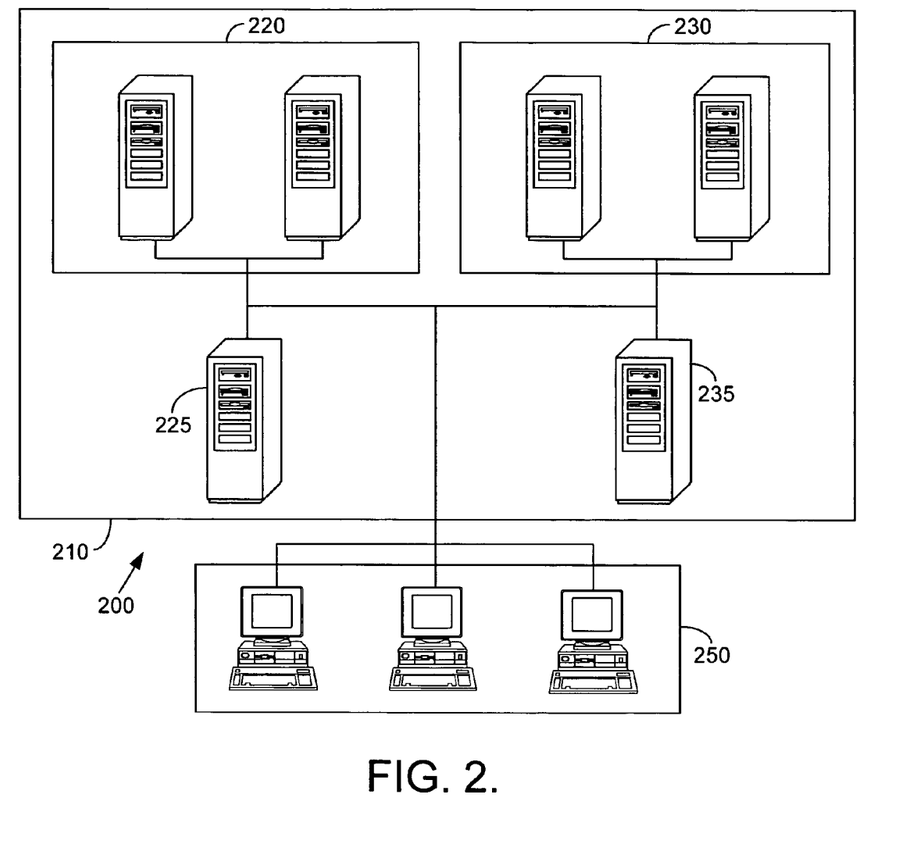
FIG. 2 is a block diagram of an exemplary operating environment illustrating an embodiment of the present invention.

In FIG. 2, a block diagram of an exemplary operating environment is shown in 200 with a network 210. Network 210 contains an operating environment of computing devices that are connected together in clusters, a cluster 220 and a cluster 230. Cluster 220 and cluster 230 are also connected respectively to a computing device 225 and a computing device 235. Network 210 is also connected to a users 250.

Network 210 illustrates an implementation of a non-geo-redundant computer network that does not incorporate a total redundancy of the computing devices. A georedundant computer network doubles the number of computing devices needed in a network. In network 210, the critical computing devices are indicated by cluster 220 and cluster 230. The illustration shows four computing devices required for use by users 250. Such configuration may change depending upon other implementations of the present invention. In the current state of the art, cluster 220 and cluster 230 may be doubled in order to implement a georedundant system to prevent downtime from failures in the network operation. In such case, there would be eight computing devices rather than the six currently shown. However, here in the current embodiment of the present invention, two computing devices, indicated by computing device 225 and computing device 235, are added to provide a system to prevent downtime.

Figure 4:
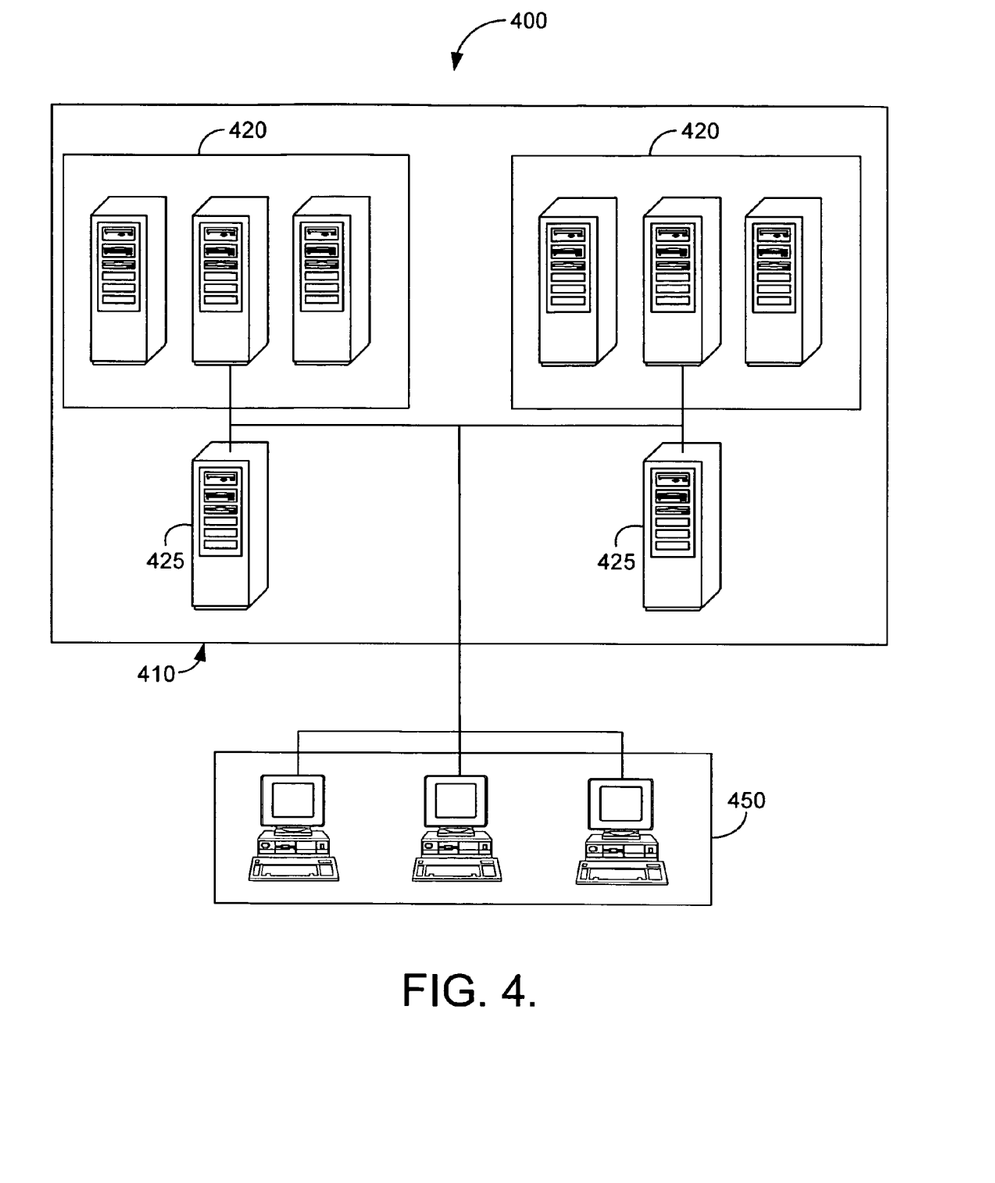
FIG. 4 is a block diagram of an exemplary operating environment illustrating an embodiment of the present invention.

Computing device 225 and computing device 235 operate at capacity levels different from the computing devices contained within cluster 220 and cluster 230 although all of the computing devices may be configured identically or similarly. For example, computing devices in cluster 220 and cluster 230 may operate at a capacity ranging between 40% and 80% processor utilization. The amount of operating capacity depends on the number of computing devices located within cluster 220 and cluster 230. In the illustration here, only two computing devices are shown in each cluster. Therefore, their operating capacity would be around 80% for each computing device in cluster 220 and cluster 230. In FIG. 4, as will be shown later, the operating capacity would be around 67% for the three computing devices. In both FIG. 2 and FIG. 4, computing device 225 and computing 235 (also shown as a computing device 425 and a computing device 435 in FIG. 4) have a fixed operating capacity of 80% each. It is only coincidental that the capacities are 80% for all of the computing devices in FIG. 2. The capacities for the computing devices in FIG. 4 are different. Furthermore, in FIG. 2, computing device 225 and computing device 235 do not handle operating activity under normal conditions. Computing device 225 and computing device 235 are used as spares to offload computing traffic in the event of a failure at either cluster 220 or cluster 230. If a failure occurs at one of the computing devices in cluster 220, then the computing activity from the failed device transfers to the remaining computing devices in cluster 220 and to the computing device 225.

Network 210 is an example of one embodiment of the present invention. Other embodiments may exist as is shown in FIG. 4. Whenever a system is configured with computing devices to perform critical services, two additional computing devices may be provisioned along with the original deployment to reduce downtime from failures in the network.

One may note that the computing devices in cluster 220 and cluster 230 may be located in a variety of places. For example, cluster 220 may consist of a computing device located in San Francisco and another located in Denver while cluster 230 may consist of computing devices located in Chicago and Washington. Concurrently, computing device 225 may reside in Phoenix while computing device 235 may reside in New York. The idea is to convey that the computing devices are not bound to a specific location and may be freely moved to another location in order to accomplish the desired business task.

Users 250 are shown in FIG. 2 to illustrate their connection to network 210. Users 250 may be located in different places connected to network 210. User 250 may also be connected to each other. The illustration in FIG. 2 shows that users 250 are not located in the same place as cluster 220 or cluster 230. The illustration also shows the dependency that users 250 have on an operating network 210 that must be available constantly. For example, if users 250 operate such businesses as security services, airline operations, safety, etc., then network 210 must provide critical systems that have continuous availability, and minimal or no downtime.

Figure 3:
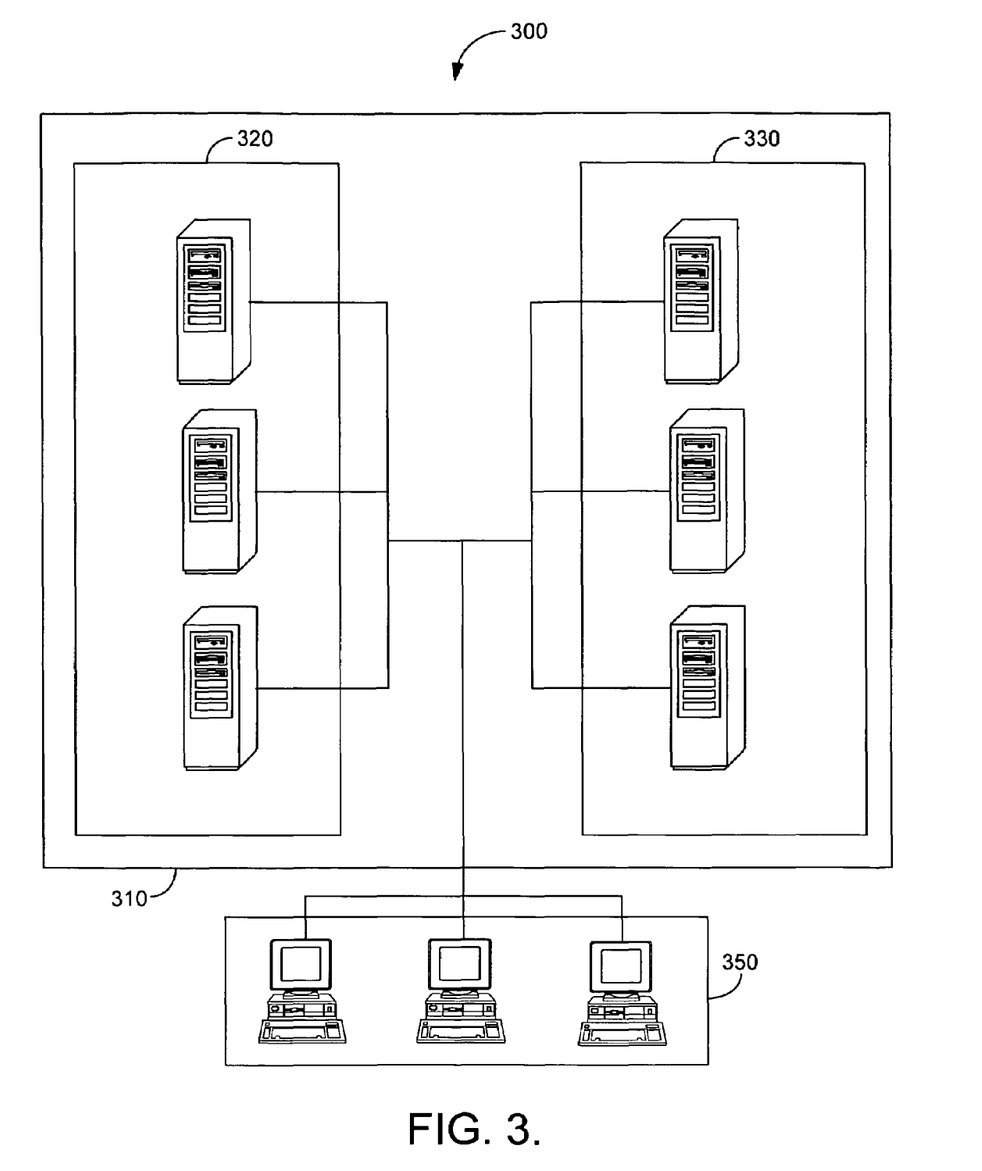
FIG. 3 is a block diagram of the current state of the art.

A comparison may be made to the current state of the arts by viewing FIG. 2 and FIG. 3. In FIG. 3, a georedundant network is shown in 310. The computing devices in cluster 320 are a mirror image of the computing devices in cluster 330. Every time a computing device is purchased for one cluster, a corresponding computing device must be purchased for the other cluster. The costs may be extremely prohibitive for users 350 to afford the services from the implementation of the systems in network 310.

Now referring to FIG. 4, another block diagram illustrating an embodiment of the present invention is shown in 400. FIG. 4 illustrates that computing devices may be added to the network (adding to network 210) to perform work without adding more redundant systems as is shown in a network 410. Network 410 is similar to network 210 in FIG. 2 with the exception that additional computing devices are added to perform increased business tasks. A cluster 420 and a cluster 430 show computing devices that may operate in network 410 to perform critical business functions. Computing device 425 and computing device 435 are provided to implement a non-georedundant configuration for the present invention. If a georedundant configuration is implemented for the six critical computing devices indicated by cluster 420 and cluster 430, then twelve computing devices would have to be implemented rather than the eight shown in FIG. 4.

As was discussed earlier, if a failure occurs in one of the computing devices in cluster 420, computing device 425 operates to insure continued operation in network 410. Likewise, if a failure occurs in one of the computing devices in cluster 430, computing device 435 operates to insure continued operation in network 410. Continued operation in network 410 relating to cluster 420 and cluster 430 occurs automatically through operating computer software designed for this type of activity.

Figure 5:
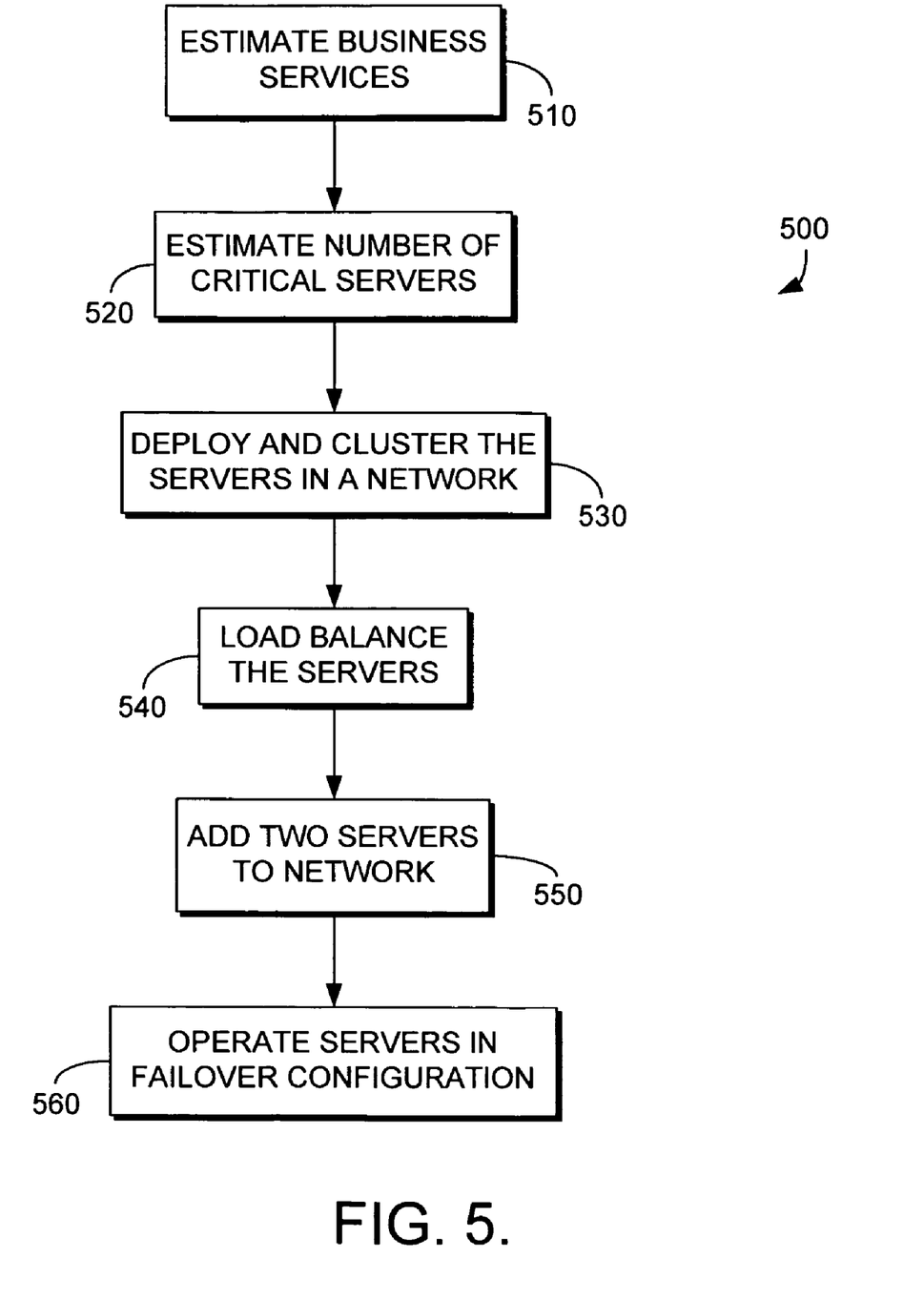
FIG. 5 is a flowchart illustrating an exemplary process for operating an embodiment of the present invention.

Now referring to FIG. 5, a process is shown implementing an embodiment of the present invention in 500. The present invention functions with some known variables such as how much business traffic needs to be processed in a network for customers, a step 510. The amount of business traffic correlates to the size of the network and the number of computing devices in the network. Therefore, a forecast of the number of servers is needed to go along with the estimate of the amount of business traffic, a step 520.

In the present invention, business traffic may take on the notion of being many things. For example, business traffic could include a software application processing on one or more servers; and it could also be numerous software applications operating on one server. The idea here is to indicate that business traffic may include unrelated activities operating in the form of computer software instructions on various servers. Also, business traffic pertains to business services provided to customers, and the business traffic is so critical that minimal or no downtime may be tolerated.

Because new services are always being deployed or optimized, and new customers are always being added, a regular forecast of computing needs may be performed to insure availability of the network. Steps 510 and 520 are indicative of the activities that may be performed in the area to keep pace with the changing needs of customers. Along with steps 510 and 520, continuing adjustments may need to be made to determine the best way to implement a non-georedundant configuration for a failover system while also adding new services and new customers.

In a step 530, servers may be deployed over a varied geographic area as discussed in FIG. 2 and FIG. 4. The servers may be deployed in clusters in the network in order to have servers that execute similar computer software instructions operate together. This is not always the case as a cluster may be defined according to the geographic location of the servers and not by the computer software instructions. For example, servers in San Francisco, Seattle, and Denver may operate in one cluster while servers in Boston, New York, and Washington may operate in another cluster. The servers in each cluster may perform different tasks. The discussion of clusters is merely exemplary and may change depending upon the implementation of embodiments of the present invention. But whereas the location of the servers may change, an ideal goal may be to have each server in a cluster share the same workload (but not necessarily perform the same work) as indicated in a step 540. In this way, no particular server may become overloaded in processing computer software instructions.

As the number of servers may be estimated for business transactions, two additional servers may be added to implement a non-georedundant configuration for a failover system as indicated in a step 550. As was discussed earlier, the two servers operate with more capacity than the critical servers determined in step 520. Using the information from above, the two servers may have available processing capability of 80% which will not be used until a failure occurs in one of the critical servers. On the other hand, the critical servers may have processing capabilities starting around 40% depending on the number of critical servers in the network. Remember, 40% is the processing utilization for a server in the georedundant network with its remaining 40% used for failover situations and 20% reserved for administration needs. In the non-georedundant configuration, the server may operate at a higher capacity (higher than 40%) since there is a supporting structure of the two additional servers in reserve to handle failover situations. Remember, in the georedundant configuration, the servers had to be part of the processing activities of business transactions in the network. In the non-georedundant configuration, the two servers are only used when a failure occurs. As a result, the critical servers may process more business transactions, a step 560.

Although many of the steps identified in FIG. 5 are dependent upon one another, the steps may be performed in another sequence than the one described above. The current illustration and discussion is merely exemplary and does not signify a hard-coded process to be followed. For example, step 550 may be implemented in another embodiment of the present invention to occur before step 530. Also, step 540 may be executed after step 550.

Figure 6:
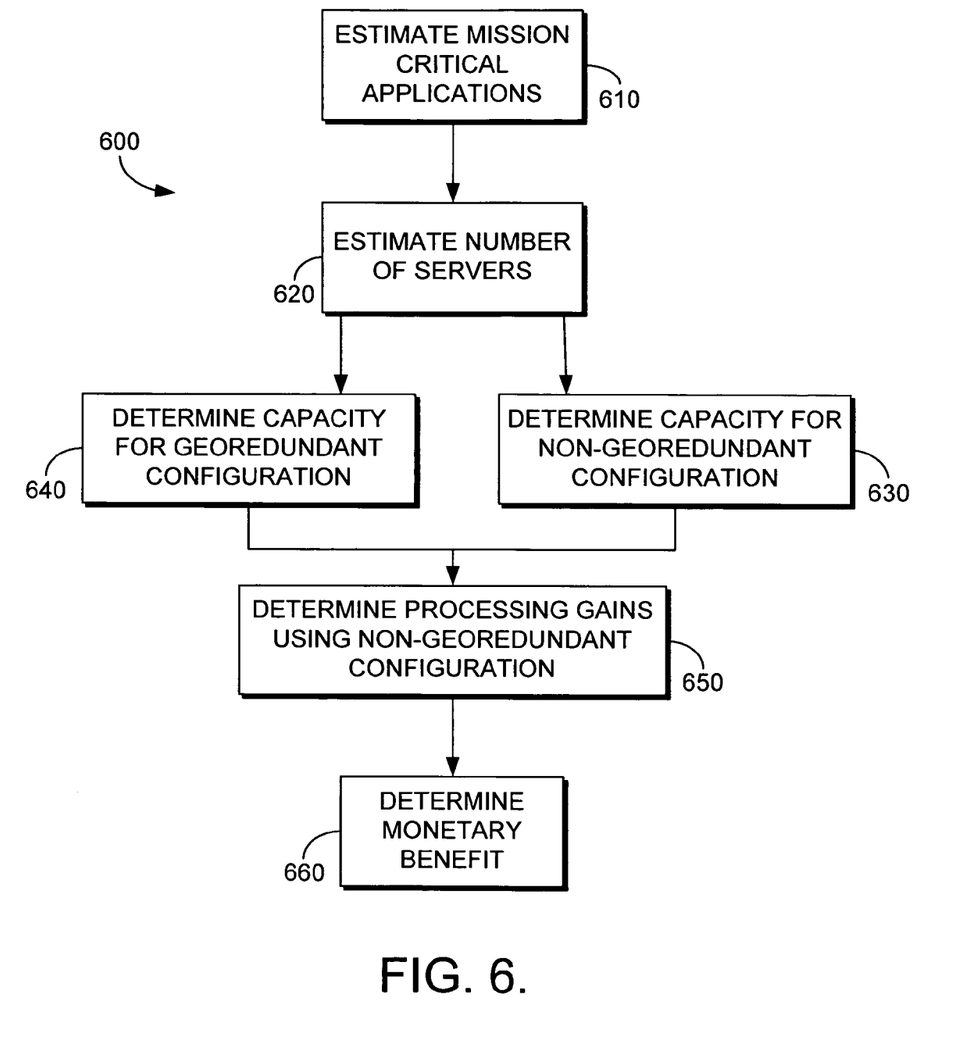
FIG. 6 is a flowchart illustrating an exemplary process for operating an embodiment of the present invention.

In FIG. 6, another exemplary process of an embodiment suitable for practicing the present invention is shown in 600. With the administering of computer systems in a network, system administrators and other business people want to know business costs, network availability, and processing capacity for the deployment of business services. The illustration in FIG. 6 provides a process for estimating the processing gains for implementing a non-georedundant failover system rather than a georedundant failover system.

Steps 610 and 620 are similar to steps 510 and 520 discussed in FIG. 5 and shall not be discussed here. In a step 630, a capacity for the critical servers is determined based upon the critical servers being deployed in the non-georedundant configuration. The capacity may be determined by an equation identified by [(N*40%)+160%]. The letter N represents the total number of critical servers estimated in step 620. The number 40% represents the processing utilization of the individual critical servers as if they were deployed in a georedundant configuration. The number 160% represents the processing utilization of the two additional servers (80% each). For a step 640, the capacity for the critical servers may be determined as if they were deployed in the georedundant configuration. The capacity would be determined by the equation [N'*40%]. N' represents the total number of servers deployed in a georedundant configuration. Again, 40% represents the processing utilization of the servers as if they were deployed in the georedundant configuration. One may note the difference between N and N' in the equations to determine capacity.

| N or N' = total number of servers that handle software instructions under normal conditions[1] | | 1 | 2 | 4 | 8 | 16 |
|---|---|---|---|---|---|---|
| Non-georedundant configuration for N servers | [(N * 40%) + 160%] | 200% | 240% | 320% | 480% | 800% |
| Georedundant configuration for N' servers | [N' * 40%] | N/A | 80% | 160% | 320% | 640% |

If the total number of critical servers are the same for both the non-georedundant configuration and the georedundant configuration, N' would equal 2N, and N would be the critical number of servers for both configurations. The non-georedundant configuration will have N+2 total servers while the georedundant configuration will have 2N total servers. When N equals 2, both configurations have the same total number of servers. However, their total available processing capacity is different. The non-georedundant configuration yields a total operating capacity greater than or equal to 240%. The georedundant configuration yields a total operating capacity equal to 160%. One may note that the servers have much more physical capacities (approx. 400%) as explained above (four servers multiplied by 100% capacity) than useable capacity in the implementation. When N equals 5, the non-georedundant configuration has 7 total servers and the georedundant configuration has 10 total servers. The cost of implementing the non-georedundant configuration may be seen in the comparison of the number of servers. And if a server costs approximately $168,000, an immediate cost savings may be gained in the amount of $504,000 by implementing the non-georedundant configuration in place of the georedundant configuration.

In a step 650, a difference between the capacities for the non-georedundant configuration and the georedundant configuration is determined. One may determine the processing gains using the equations above. The above-mentioned chart illustrates the available capacity for deploying similar numbers of servers in the network. A determination may be made for calculating the costs of both configurations and determining the monetary benefit of implementing one configuration over another, a step 660. The decision factor for configuring a non-georedundant failover system may be determined by the capacity gains and cost reductions. In furtherance of the discussion above, the net gain per server utilization may be determined by [(N*40%)+160%]/N−40% and the net return over investment per total deployment of the non-georedundant failover system over the georedundant failover system may be determined by R/U*[((N*40%)+160%)-N*40%]−2*server cost. The definition of N was discussed above and need not be repeated here. R/U represents the estimated revenue per unit of utilization which is derived from R/T (revenue per business transactions) multiplied by T'/U (loaded transactions per unit of utilization). R and T represent an estimation of the total revenue expected from processing and an estimation of the number of business transactions. T' and U represent the amount of transactions and unit of utilization measured from load testing a server or servers over a fixed time interval. Load testing may occur by inputting to the server a set of dummy computer software instructions to simulate an actual operating environment. The load testing can provide details on the processing capability of the server as well as provide behavioral measurements of the server under various operating conditions.

As stated in FIG. 5, the steps discussed in FIG. 6 are exemplary and do not imply an exact execution of the process as shown. FIG. 6 illustrates one way the embodiment may be implemented for the present invention. Steps in FIG. 6 may be implemented without regard to the order as shown.

Figure 7:
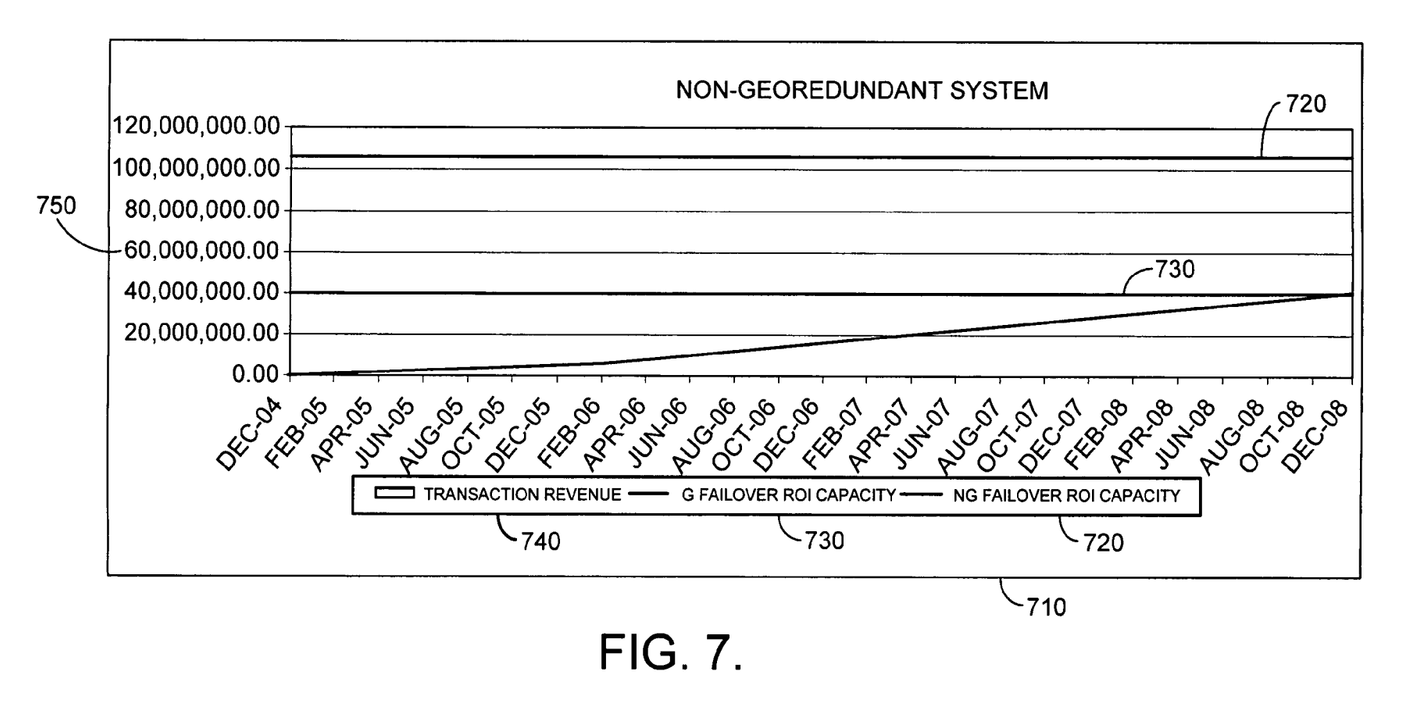
FIG. 7 is an exemplary graph illustrating return over investments from implementing an embodiment of the present invention.

In FIG. 7, a graph illustrating return over investment for a non-georedundant failover system is shown in 700. A graph 710 contains an NG capacity 720, a G capacity 730, a revenue 740, and a ROI 750. Graph 710 shows a pictorial representation of the gains made in terms of capacity and monies when selecting the non-georedundant failover system over the georedundant failover system.

NG capacity 720 is a graphical line depicting the non-georedundant investment capacity in terms of money over a span of time. G capacity 730 is a graphical line depicting the georedundant investment capacity in terms of money over a span of time. Graph 710 shows that from December 2004 to approximately December 2008, the return over investment gain for NG capacity 720 is approximately $65 Million greater than G capacity 730. The return over investment for increased computing power in NG capacity 720 versus G capacity 730 configuration is referenced against transaction forecasts that generate revenue. The revenue forecasts are broken down by month and dollar value. The relative computing power of NG capacity 720 and G capacity 730 reflects the maximum dollar generation. The graph shows that the maximum dollar generation of G capacity 730 may meet the forecasted needs of the business until the end of December 2008. However, the maximum dollar generation of NG capacity 720 is not exceeded by the forecasted needs of the business until a much later point in the future. Therefore, new hardware purchasing is not needed.

One skilled in the art will appreciate that methods and system in accordance with the present invention may be implemented using computer software. Such software may take the form of computer-readable code embodied on one or more computer-readable media. Software implementing the present invention may operate independently, but may also be incorporated with other software or vendor programs. Various software languages may be used to implement methods and systems in accordance with the present invention.

The invention claimed is:

1. A computer-implemented method for determining processing gains in a non-georedundant environment, comprising:
   estimating a number of computing devices to execute a set of business services in a network;
   calculating a first capacity for the number of computing devices in a georedundant configuration wherein the georedundant configuration includes a first subset of the number of computing devices which are duplicates of each other and wherein the first subset of the number of computing devices are implemented in a hot stand-by mode or a mirrored mode;
   calculating a second capacity for the number of computing devices in a non-georedundant configuration wherein the non-georedundant configuration includes an addition of two computing devices to the number of computing devices; and
   determining processing gains between the first capacity and second capacity wherein determining processing gains include steps of:
   (a) multiplying the number of computing devices by at least forty percent to yield a result, wherein the forty percent is a processing utilization of an individual servers in the georedundant configuration,
   (b) adding to the result of step (a) at least eighty percent, wherein the eighty percent is the processing utilization of any additional servers in the georedundant configuration,
   (c) dividing the result of step (b) by a total number of computing devices, and
   (d) subtracting at least forty percent from the result of steps (a) and (b).

2. The method of claim 1, wherein the set of business services comprises at least one of a transaction and an application operating in the number of computing devices.

3. The method of claim 2, wherein business services comprises mission critical applications to operate on the number of computing devices in the network.

4. The method of claim 2, wherein the georedundant configuration comprises doubling the number of computing devices in the network to prevent downtime.

5. The method of claim 4, wherein the non-georedundant configuration comprises adding two computing devices to the number of computing devices to prevent downtime of the set of business services, the number of computing devices further comprising an even number of computing devices.

6. The method of claim 5, wherein adding two computing devices comprises configuring the two computing devices to takeover operation from a failure of one or more computing devices within the number of computing devices.

7. A computer-readable storage medium having instructions stored thereon executed by a processor for performing the method of claim 1.

8. The method of claim 1, wherein the first subset of the number of computing devices operates under fifty percent capacity for each computing device.

9. The method of claim 4, wherein the georedundant configuration further comprises the number of computing devices also connected to an original computer system.

10. The method of claim 9, further comprising determining a monetary benefit to implement the georedundant configuration or the non-georedundant configuration.

11. A computer-implemented method for determining processing gains in a non-georedundant network configuration, comprising:
- determining a number of computing devices to execute a set of business services of which includes at least one transaction and an application in the number of computing devices;
- calculating a first capacity for the number of computing devices in a georedundant configuration wherein the georedundant configuration includes a first subset of the number of computing devices which are duplicates of the number of computing devices;
- calculating a second capacity for the number of computing devices in a non-georedundant configuration wherein the non-georedundant configuration includes an addition of two computing devices to the number of computing devices and wherein the addition of two computing devices includes configuring the two computing devices to takeover operation from a failure of one or more computing devices within the number of computing devices;
- and determining processing gains between the first capacity and second capacity wherein determining processing gains include steps of:
  - (a) multiplying the number of computing devices by at least forty percent to yield a result, wherein the forty percent is a processing utilization of an individual servers in the georedundant configuration,
  - (b) adding to the result of step (a) at least eighty percent, wherein the eighty percent is the processing utilization of any additional servers in the georedundant configuration,
  - (c) dividing the result of step (b) by a total number of computing devices, and
  - (d) subtracting at least forty percent from the result of steps (a) and (b).

12. The method of claim 11, further comprising determining a financial benefit to implement the georedundant configuration or the non-georedundant configuration.

* * * * *